United States Patent [19]
Liu

[11] Patent Number: 6,147,675
[45] Date of Patent: Nov. 14, 2000

[54] INPUT DEVICE FOR TRANSMITTING AN INPUT SIGNAL TO A COMPUTER GAME PORT

[75] Inventor: Shu-Ming Liu, Taipei, Taiwan

[73] Assignee: Primax Electronics Ltd., Taipei Hsien, Taiwan

[21] Appl. No.: 08/984,449

[22] Filed: Dec. 3, 1997

[30] Foreign Application Priority Data

Jun. 17, 1999 [TW] Taiwan ................................ 8018475

[51] Int. Cl.[7] ........................... G09G 5/00; A63F 13/06
[52] U.S. Cl. ........................ 345/157; 345/156; 463/36
[58] Field of Search ............................ 345/156, 157, 345/159; 463/36

[56] References Cited

U.S. PATENT DOCUMENTS

| | | | |
|---|---|---|---|
| 4,301,503 | 11/1981 | Frederikson | 345/433 |
| 5,230,059 | 7/1993 | Nielsen et al. | 345/161 |
| 5,558,329 | 9/1996 | Liu | 345/156 |
| 5,668,338 | 9/1997 | Hewitt et al. | 84/629 |
| 5,714,981 | 2/1998 | Scott-Jackson et al. | 345/156 |

*Primary Examiner*—Steven J. Saras
*Assistant Examiner*—William C. Spencer

[57] ABSTRACT

The present invention discloses an input device for transmitting an input signal to a computer through a game port of the computer. The game port comprises a capacitor and a detecting circuit for detecting a time period needed for charging the capacitor to a threshold voltage, discharging the capacitor when the capacitor is charged to the threshold voltage, and transmitting the detected time period as an input to the computer. The input device comprises a first charging circuit wired to the capacitor for slowly charging the capacitor, a second charging circuit wired to the capacitor for quickly charging the capacitor, and a control circuit wired to the capacitor used for activating the second charging circuit according to the input signal. The control circuit activates the second charging circuit according to the voltage of the capacitor and the input signal so that the capacitor can be quickly charged to the threshold voltage.

2 Claims, 2 Drawing Sheets

INPUT DEVICE FOR TRANSMITTING AN INPUT SIGNAL TO A COMPUTER GAME PORT

BACKGROUND OF THE INVENTION

1. Field of the Invention

The present invention relates to an input device of a computer, and more particularly, to an input device for transmitting variable input signals to a computer game port.

2. Description of the Prior Art

Many computer input devices, such as a joystick, import their input signals to a computer through its game port. A personal computer game port comprises a capacitor and a detecting circuit for detecting a time period needed for charging the capacitor from 0 V to a threshold voltage. The detected time period will be transmitted as an input signal to the computer and the capacitor will be discharged for another input. When the voltage of the capacitor is dropped to 0 V, the input device will recharge the capacitor. A conventional input device uses a DC power supply and a serially connected variable resistor to charge the capacitor inside the game port. The resistance of the variable resistor controls the charging time of the capacitor. The variation over the variable resistor changes the time period detected by the detecting circuit of the game part and the time period is periodically transmitted to the computer as input signals.

Using variable resistors to generate input signals may cause the following three problems. First, a variable resistor is a passive element and its resistance varies in different environmental conditions. This may downgrade the accuracy and stability of the input signals. Second, friction in a variable resistor may cause mechanical damage to the variable resistor if it is frequently or forcefully used such as the variable resistors used in a joystick. Third, variable resistors must be constantly calibrated in order to improve its accuracy. This is quite inconvenient.

SUMMARY OF THE INVENTION

It is therefore a primary objective of the present invention to provide a game port input device which can solve the aforementioned problems.

In a preferred embodiment, the present invention provides an input device for transmitting variable input signals to a computer through a game port of the computer, each input signal representing a currently corresponding input [from] received the input device, the game port comprising a capacitor and a detecting circuit for detecting a time period needed for charging the capacitor to a threshold voltage, discharging the capacitor when the capacitor is charged to the threshold voltage, and transmitting each detected time period to the computer for further recognizing each corresponding input [from] received by the input device, the input device comprising:

a first charging circuit wired to the capacitor for slowly charging the capacitor;

a second charging circuit wired to the capacitor for quickly charging the capacitor; and a control circuit comprising a comparator wired to the capacitor used for activating the second charging circuit according to the input signal, the comparator comparing the voltage of the capacitor to a reference voltage of the input signal;

wherein when the voltage of the capacitor exceeds the reference voltage of the input signal, the comparator of the control circuit immediately activates the second charging circuit so that the capacitor can be quickly charged to the threshold voltage.

It is an advantage of the present invention that the input device uses a control circuit instead of a variable resistor, to determine when the second charging circuit should be activated to quickly charge the capacitor of the game port to the threshold voltage. The problems caused by the variable resistors can thus be solved.

This and other objectives and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
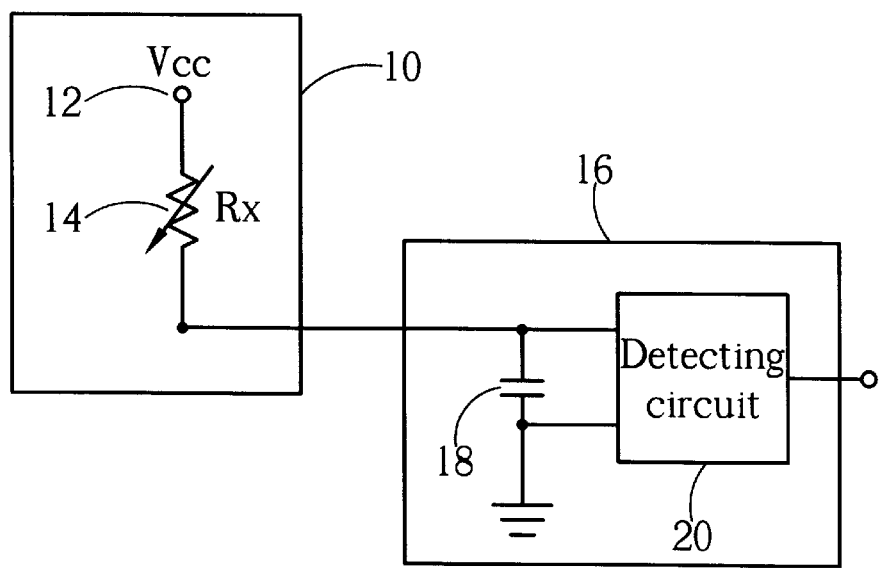
FIG. 1 shows a circuit diagram of a prior art input device wired to a game port.

Please refer to FIG. 1. FIG. 1 shows a circuit diagram of a prior art input device 10 wired to a game port 16. The input device 10 can be a joystick which comprises a DC power supply 12 and a variable resistor 14. The game port 16 comprises a capacitor 18 and a detecting circuit 20 for detecting the voltage of the capacitor 18 to determine a time period of charging the capacitor 18 from 0V to a threshold voltage, such as 3.3V. The DC power supply 12, variable resistor 14 and capacitor 18 constitute a charging loop. A charging cycle begins when the capacitor 18 is charged by the input device 10 from 0V to the threshold voltage. When the capacitor 18 reaches the threshold voltage, the detecting circuit 20 will transmit the detected time period to a computer as an input signal and discharge the capacitor 18 to 0V. Another charging cycle will follow later on in the same format. The resistance of the variable resistor 14 in the input device 10 is constantly changed by a user and the resistance of the variable resistor 14 will determine how long the capacitor 18 can be charged to the threshold voltage. Inputs from the input device 10 are thus transmitted to the computer's game port 16.

Figure 2:
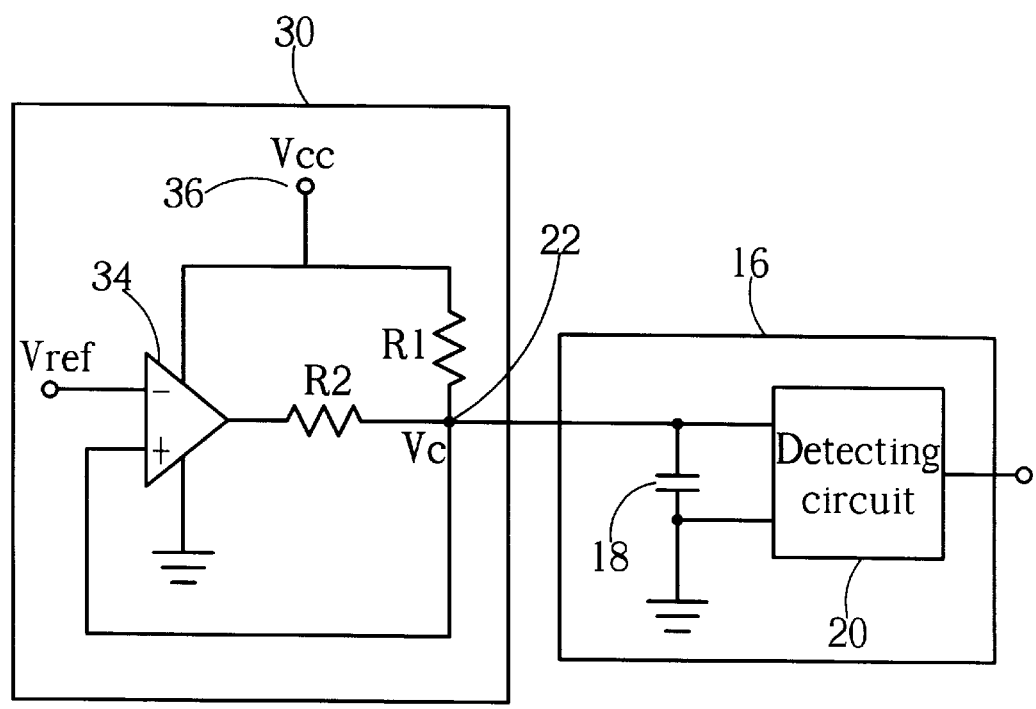
FIG. 2 shows a circuit diagram of an input device according to the present invention.

Please refer FIG. 2. FIG. 2 shows a circuit diagram of an input device 30 wired to a game port 16 according to the present invention. The input device 30 comprises a first charging circuit, a second charging circuit and a control circuit. The first charging circuit is used for slowly charging the capacitor 18 with a fixed time constant. It comprises a DC power supply 36 and a resistor R1. The second charging circuit is used for charging the capacitor 18 quickly. It is constituted by the output portion of an operational amplifier 34 and a resistor R2. The control circuit is constituted by the input and comparison portions of the amplifier 34 which is used for activating the second charging circuit according to a reference voltage Vref of an input signal and the voltage Vc22 of the capacitor 18. The amplifier 34 is used as a comparator for comparing the reference voltage Vref and the voltage Vc22 of the capacitor 18. A feedback from the capacitor 18 is connected to the positive input of the amplifier 34 and the reference voltage Vref is connected to the negative input of the amplifier 34. When the voltage Vc22 of the capacitor 18 is charged higher than the reference voltage Vref by the first charging circuit, the second charging circuit which is the output portion of the amplifier 34 will quickly generate an output to charge the capacitor 18.

Figure 3:
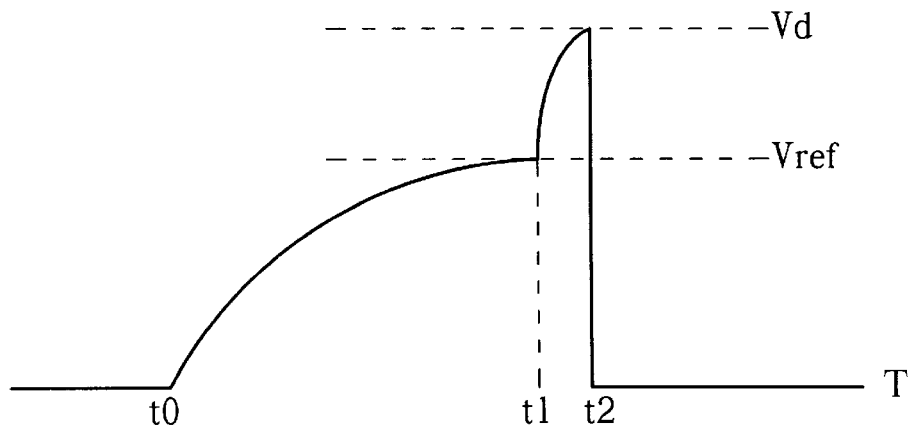
FIG. 3 shows the output voltage of the input device shown in FIG. 2.

Please refer to FIG. 3. FIG. 3 shows the output voltage of the input device 30 shown in FIG. 2. Vd is a threshold voltage of the capacitor 18. The first charging circuit of the input device 30 will slowly charge the capacitor 18 using a fixed time constant from time t0. The input device 30 generates a reference voltage Vref as its input signal which will be transmitted to a computer through the game port 16. When the reference voltage Vref is changed, the time for charging the capacitor 18 from 0V at time t0 to the reference voltage Vref at time t1 by the first charging circuit is also changed. When the capacitor 18 is charged to the reference voltage Vref, the second charging circuit will be activated to quickly charge the capacitor 18 to the threshold voltage Vd at t2. At this time, the detecting circuit 20 of the game port 16 will transmit the detected time period (t0 to t2) to the computer and discharge the capacitor 18 to 0V.

Figure 4:
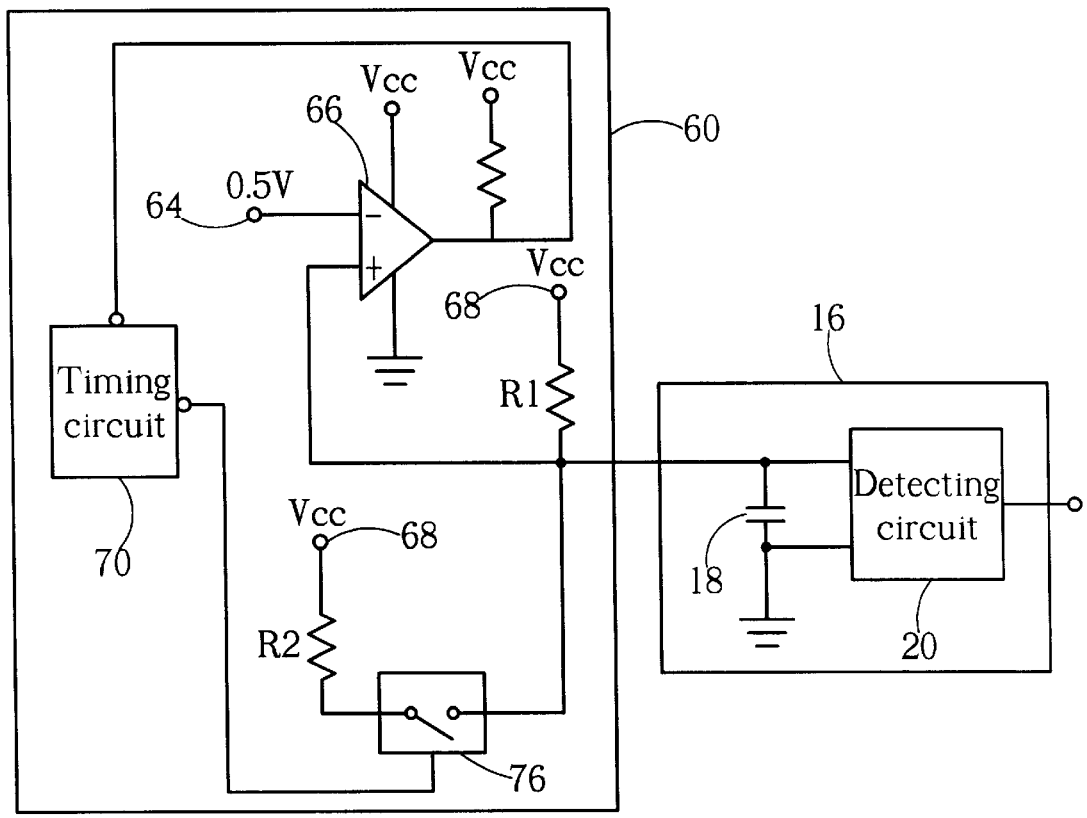
FIG. 4 shows an alternative embodiment of an input device according to the present invention.

Please refer to FIG. 4. FIG. 4 shows another input device 60 of the present invention. The input device 60 comprises a first charging circuit, a second charging circuit, and a control circuit. The first charging circuit comprises a DC power supply 68 and a resistor R1 for slowly charging the capacitor 18 in a fixed time constant. The second charging circuit comprises the DC power supply 68, a resistor R2 and a switch 76 which is used for quickly charging the capacitor 18. The control circuit comprises an amplifier 66 and a timing circuit 70 which is used for activating the second charging circuit to charge the capacitor 18. A feedback from the capacitor 18 is connected to the positive input of the amplifier 66 which is compared with a starting voltage 64, such as 0.5V. When the voltage of the capacitor 18 is charged by the first charging circuit to the starting voltage 64, the output of the amplifier 66 will activate the timing circuit 70 to count a time period which is used as an input signal of the input device 60 to the game port 16. When the time period is reached, the timing circuit 70 will generate an output to turn on the switch 76 of the second charging circuit, and the second charging circuit will quickly charge the capacitor 18 of the game port 16 to the threshold voltage. As soon as the capacitor 18 reaches the threshold voltage, the detecting circuit 20 will transmit the detected time period to the computer and discharge the capacitor 18 to 0V.

The input device 60 differs from the input device 30 in that the input device 60 uses the time period set in the timing circuit 70 as an input to the game port 16 of the computer. When the time period is changed, the charging time detected by the detecting circuit 20 will be changed accordingly. Comparing to the prior art input device 10 shown in FIG. 1, none of the input devices 30 and 60 of the present invention uses variable resistors for transmitting signals to computers. The analog reference voltage Vref of the device 30 and the digital time period of the device 60 can both be easily controlled by using digital circuits. The accuracy and reliability of the input devices 30 and 60 are thus much better than the prior art input device 10.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An input device for transmitting variable input signals to a computer through a game port of the computer, each input signal representing a currently corresponding input received by the input device, the game port comprising a capacitor and a detecting circuit for detecting a time period needed for charging the capacitor to a threshold voltage, discharging the capacitor when the capacitor is charged to the threshold voltage, and transmitting each detected time period to the computer for further recognizing each corresponding input received by the input device, the input device comprising:

a first charging circuit wired to the capacitor for charging the capacitor;

a second charging circuit wired to the capacitor for quickly charging the capacitor; and a control circuit comprising a comparator wired to the capacitor used for activating the second charging circuit according to the input signal, the comparator comparing the voltage of the capacitor to a reference voltage of the input signal;

wherein when the voltage of the capacitor exceeds the reference voltage of the input signal, the comparator of the control circuit immediately activates the second charging circuit so that the capacitor can be quickly charged to the threshold voltage.

2. The input devise of claim 1 wherein the first charging circuit charges the capacitor in a fixed time constant.

\* \* \* \* \*